United States Patent [19]
Russo

[11] 3,983,571
[45] Sept. 28, 1976

[54] ELECTRONIC IMAGE IDENTIFYING SYSTEM

[75] Inventor: Paul Michael Russo, Princeton, N.J.
[73] Assignee: RCA Corporation, New York, N.Y.
[22] Filed: June 30, 1975
[21] Appl. No.: 591,952

[52] U.S. Cl. ............................ 354/105; 235/92 V; 355/41
[51] Int. Cl.² ........................................ G03B 17/24
[58] Field of Search ............ 354/105, 109; 355/40, 355/41, 112, 13; 235/92 N, 64.7, 98 C, 91 C

[56] References Cited
UNITED STATES PATENTS

| | | | |
|---|---|---|---|
| 2,652,744 | 9/1953 | Goldberg | 354/105 X |
| 3,371,587 | 3/1968 | Galletta | 354/109 |
| 3,613,531 | 10/1971 | Lorenzini | 355/40 |
| 3,829,869 | 8/1974 | Balko et al. | 354/109 X |
| 3,835,306 | 9/1974 | Bills et al. | 235/92 V X |

Primary Examiner—John Gonzales
Attorney, Agent, or Firm—Edward J. Norton; Carl M. Wright

[57] ABSTRACT

Counter with display devices for exhibiting successive identifiers in response to a change in ambient light such as used in reproducing an image. Each change in ambient light, such as the flash in a photocopying machine or flashbulbs in a camera, increments a counter which is coupled to display devices, which are disposed between the image to be reproduced and the image reproducing means, and which display an identifier corresponding to the number in the counter.

5 Claims, 4 Drawing Figures

ELECTRONIC IMAGE IDENTIFYING SYSTEM

BACKGROUND OF THE INVENTION

Identifying reproductions of images is often desirable. Examples include copies made by a photocopier of successive time frame photographs in locations such as airplane cockpits. Other examples are sequential photographs used by police or aerial photographs used in mapping. In the prior art, successive reproduced images were difficult to arrange in sequence where there was little or no change between successive reproduced images, such as in aerial photography. One method of identifying the sequence of photographs or reproduced images was the use of a clock built into the camera and reproduced on a portion, usually a corner, of the photograph by means of prisms within the camera. One disadvantage of this method is that where a long period of time elapses between photographs, the timing mechanism may have reached its maximum count or value and restarted from the beginning. Thus, a photograph produced shortly after a stop watch has made a complete revolution might be mistakenly assumed to have been taken prior to one which was taken when the stop watch had made half a revolution.

Document security makes it desirable to have numbered copies of reproduced reports and the like. Numbering each page of each copy is time consuming and may result in errors where there are large numbers of copies being made.

The invention disclosed herein is a document identifying device useful in many image reproducing situations.

BRIEF DESCRIPTION OF THE INVENTION

A light sensor is placed between an image to be reproduced and the image reproducing apparatus to produce an output signal in response to an increase in the level of ambient light. A counter is responsive to the output signal from the light sensor for incrementing an electrically encoded number which is displayed in a manner to be reproduced superimposed on a portion of the image reproduction.

DETAILED DESCRIPTION OF THE INVENTION

Figure 1:
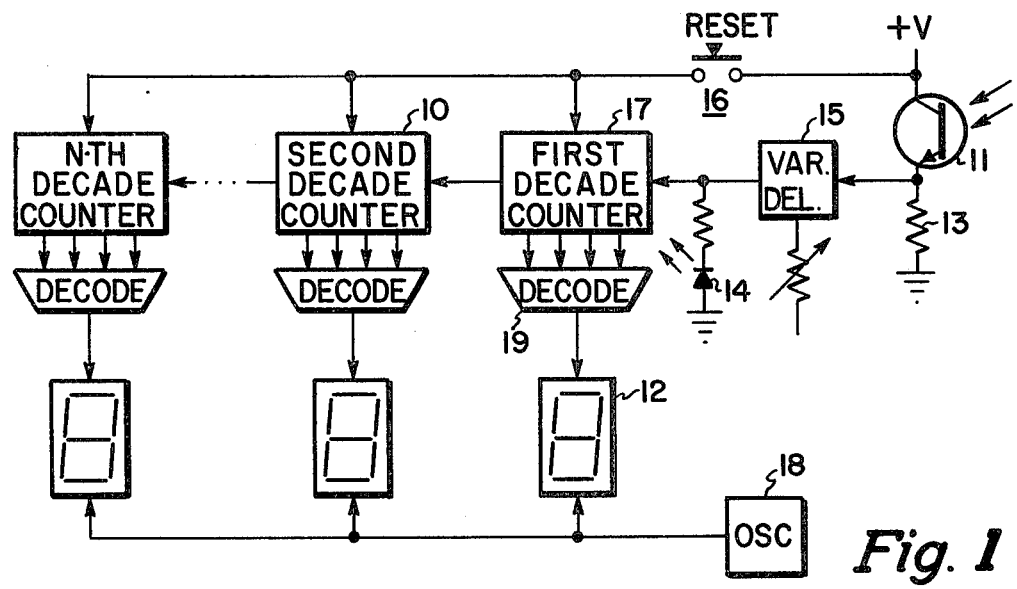
FIG. 1 is a schematic of one embodiment of the invention.

In FIG. 1, a phototransistor 11 is responsive to the ambient light. An increase in the ambient light increases the current flowing through an emitter resistor 13 producing an input signal to a variable delay 15. A typical transistor used as the phototransistor 11 might be an MRD-3051 (Motorola) with an emitter resistor having a value of approximately 30 kilohms.

The variable delay 15 produces an output signal for a given period of time after the input signal from the phototransistor 11. An input buffer or inverter may be required between the phototransistor 11 and the input port of the variable delay 15 depending on the voltage levels and polarities required. The variable delay can be implemented by a commercially available SN74555 integrated circuit (Texas Instruments) which requires a timing resistor and a timing capacitor. The details of connecting the commercially available devices are shown in application notes available from the manufacturers. The duration of the variable delay can be varied by using a potentiometer in series with or in place of the usual timing resistor.

The output signal from the variable delay 15 is coupled to a first decade counter 17. A suitable available counter is, for example, a CD4024 (RCA Corp.). The output signals from the first decade counter 17 comprise four binary bits to represent 10 combinations of signals indicating the decimal digits from zero to nine. These output signals are coupled to a decoder 19, commercially available as a CD4056 (RCA Corp.). The output signal from the decoder in the illustrative embodiment being described, is coupled to a seven-segment display device 12. The result displayed on the display device 12 is a visually readable digit from zero to nine depending on the contents of the first decade counter 17.

A carry output signal from the first decade counter 17, produced by the first decade counter or by decoding logic coupled to the output signals of the first decade counter 17 to detect a count of 10, is coupled to a second decade counter 10. The output signals from the second decade counter 10 are similarly decoded and displayed and a carry signal is propagated to successively higher order decade counters. The number of counters can be as large as required. A light emitting diode 14 is coupled to the output signal from the variable delay 15 to provide an indication of the status of the variable delay. This is useful in situations where the duration of the variable delay is measured in seconds and the LED 14 can be used as a ready indicator.

A reset signal is produced by activating a reset button 16. This causes the second and higher decade counters to be set to zero and the first decade counter to be set to a value of one.

The most useful display device for use with photocopying and flash photography appears to be liquid crystals and cathodochromic displays. They represent the only existing display technologies that modify the incident light rather than generate light in the display itself such as in LED's, incandescent displays, plasma discharge displays, and the like. As a result, the liquid crystal display (LCD) and cathodochromic (CCD) displays are the only available display technologies where the contrast and quality of the display is improved as the ambient light level increases. This unique property makes possible the use of LCDs and CCDs in high light level applications such as photocopying and flash photography.

A typical LCD useful as a display 12 in FIG. 1 is a commercially available TA8055 device (RCA Corp.). LCDs, however, require that the average voltage impressed across the display segments be zero.

The zero average potential across the LCD display devices is provided by an oscillator 18 producing an output signal having negative excursions equal to the positive excursions. A typical frequency for the oscillator 18 is 50 Hertz.

In operation, it is useful to have the phototransistor 11 disposed adjacent to the display devices 12. The reset button is used to initialize the count to one. As each image is reproduced, the phototransistor 11 is activated which in turn activates the variable delay 15. The variable delay 15 has a duration such that the copying process is completed before the decade counter 17 is incremented. Thus, each copy increments the counter for the numbering of the next copy. The LED 14 provides an indication that the counter has been incremented and is ready for the next copy.

Figure 2:
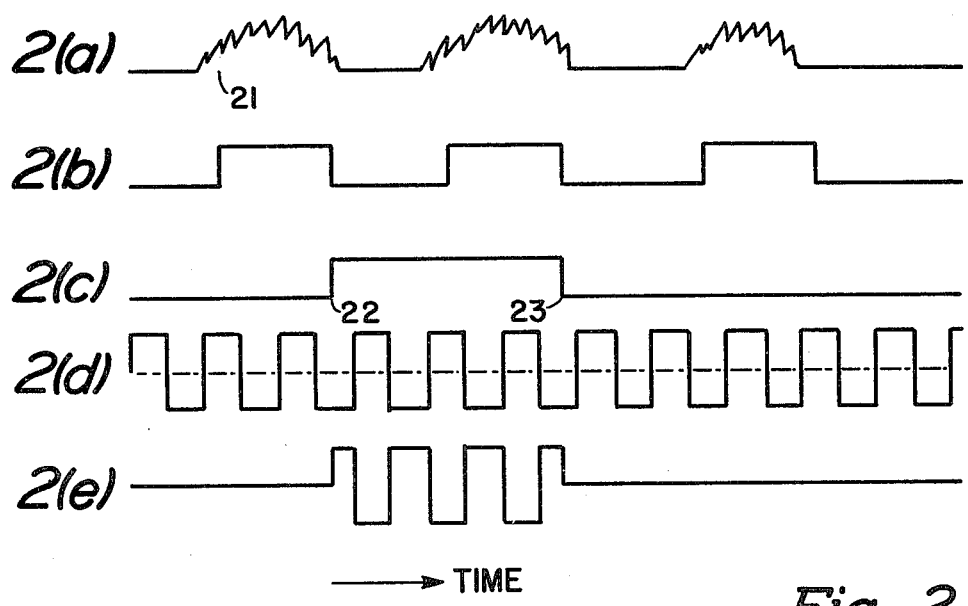
FIG. 2 is an illustration of the idealized waveforms at various points in the schematic of FIG. 1.

FIG. 2 illustrates some of the waveforms in the circuit of FIG. 1. FIG. 2(a) represents the typical output signal from the emitter of the phototransistor 11 when used on a commercially available photocopying machine. When the signal reaches a suitable value such as the time point 21, the variable delay is activated. The output signal from the variable delay is shown in FIG. 2(b).

FIG. 2(c) shows the signal at a display segment which is activated from the time period 22 to the time period 23. FIG. 2(d) is the output signal from the oscillator 18 and FIG. 2(e) is the signal impressed across the activated segment of the display device.

Figure 3:
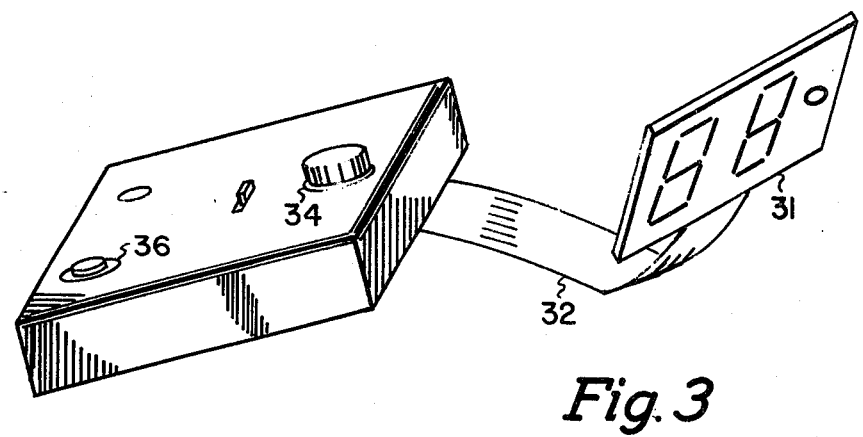
FIG. 3 is an example of one embodiment of the invention packaging.

FIG. 3 shows one method of packaging the invention. The display devices and phototransistor 11 are encompassed in a flat package 31 which is coupled to the control box 33 via a flat cable 32. Controls such as the duration adjustment of the variable delay 15 is shown as the knob 34. The reset button 16 from FIG. 1 is illustrated as the button 36.

Figure 4:
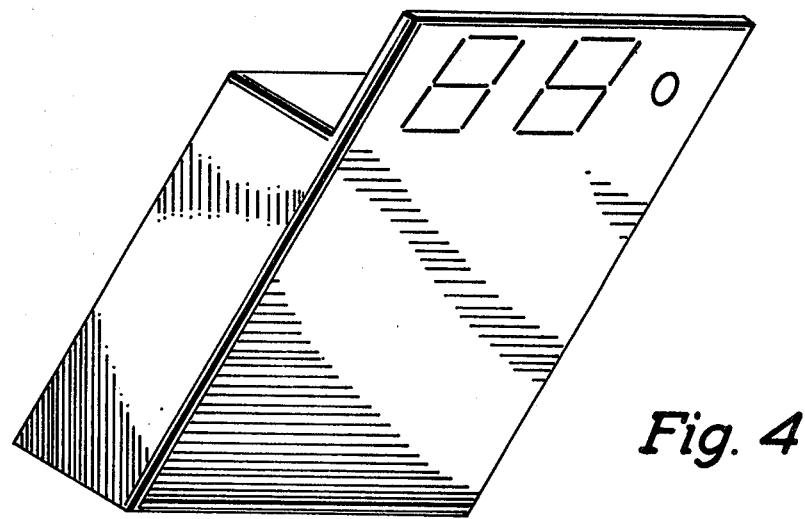
FIG. 4 is an alternate packaging arrangement.

FIG. 4 is an alternate method of packaging the invention where the display device and the phototransistor or light sensor is on an extended flat portion of a package containing the remaining parts of the circuit of the invention.

Although the preferred embodiment shows decimal digit identifiers, it is understood that other identifiers such as initials, logotypes, and the like can be used instead. Each unique identifier symbol would be activated by a correspondingly unique count in the counter.

Various modifications to this circuit described and illustrated to explain the concepts and modes of practicing the invention might be made by those of ordinary skill of the art within the principle or scope of the invention as expressed in the appended claims.

What is claimed is:

1. A image identifying system for use in a light-activated image reproduction apparatus, comprising in combination:
   light sensing means responsive to a change in ambient light generated by said reproduction apparatus for producing an output signal;
   counter means responsive to said output signal for incrementing an electrically encoded number; and
   display means arranged to be disposed between the image to be reproduced and said reproduction apparatus, and responsive to said counter means for producing an identifier corresponding to said encoded number in a manner to be reproduced superimposed on a portion of said image.

2. The invention as claimed in claim 1 including:
   delay means interconnected between said light sensing means and said counter means for inserting a time interval between said output signal and said counter means.

3. The invention as claimed in claim 2 wherein said time interval is adjustable.

4. The invention as claimed in claim 1 wherein said display means includes liquid crystal read-out means.

5. The invention as claimed in claim 1 wherein said display means includes cathodochromic display means.

* * * * *